United States Patent Office 3,376,299
Patented Apr. 2, 1968

3,376,299
ALKENYL SULFONAMIDES AND METHOD
OF MAKING THE SAME
Rudolf Kühne, Helmut Diery, and Max Grossmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 16, 1963, Ser. No. 273,287
Claims priority, application Germany, Apr. 21, 1962, F 36,622
2 Claims. (Cl. 260—247.1)

Various processes for preparing N-substituted vinylsulfonic acid amides are known. These compounds can be prepared, for example, from vinyl sulfochloride at low temperatures or from β-chloroethyl sulfochloride by the reaction with amines. Vinyl sulfonyl arylamides can be prepared from carbyl sulfate and primary or secondary aromatic amines via the intermediate step of the arylammonium salts of ethionic acid aryl amides.

Now, we have found that, surprisingly, N-substituted alkenyl-sulfonamides which contain once or twice the group

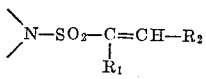

in which $R_1$ and $R_2$ each stand for a hydrogen atom, an alkyl radical, or an alkyl radical substituted by halogen atoms, can be obtained in simple manner and in direct reaction by reacting carbyl sulfate or its substitution products containing alkyl or halogeno-alkyl radicals, in the presence of alkaline earth metal hydroxides, with primary or secondary aliphatic, cycloaliphatic, araliphatic or hydrogenated heterocyclic amines whose amino groups have aliphatic nature, or with ammonia.

The basic compound of this class of compounds, namely ethene-sulfonamide, can be prepared in one reaction step from carbyl sulfate and ammonia in the presence of alkaline earth metal hydroxides. Up to now, this compound could be prepared by a very complicated method only. Matlack (cf. Journal of the Organic Chemistry, (London), Volume 23, (1928), pages 729–731) prepared ethene-sulfonamide in very small yield by the pyrolysis of tris-(2-sulfamyl-ethyl)-amine with alumina. The tris-(2-sulfamylethyl)-amine itself was prepared by the reaction of carbyl sulfate with liquid ammonia. Matlack points out that in the reaction of carbyl sulfate with liquid ammonia, it is not possible to stop the reaction at the ethene-sulfonamide stage. It is, therefore, very surprising that the said compound can be prepared under the conditions of the process of this invention in a direct reaction from carbyl sulfate and aqueous ammonia in the presence of alkaline earth metal hydroxides.

The carbyl sulfates which may be used in the process of the present invention may be obtained, for example, from olefines and sulfur trioxide and they correspond to the general formula

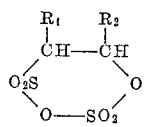

in which $R_1$ and $R_2$ each represent hydrogen atoms or alkyl radicals, preferably low molecular weight alkyl radicals which may be substituted by halogen atoms. Furthermore, the radicals $R_1$ and $R_2$ may also form a saturated ring. There are mentioned, by way of example: carbyl sulfate, methyl-carbyl sulfate (from propene), dimethyl-carbyl sulfate (from butene-2), ethyl-carbyl sulfate, n-butyl-carbyl sulfate, n-decyl-carbyl sulfate, chloromethyl-carbyl sulfate, and so on.

As amines which may be used as reaction components in the process of the present invention, there may be mentioned in addition to ammonia:

Primary and secondary aliphatic, cycloaliphatic and araliphatic amines whose amino groups may have primary or secondary nature. The alkyl substituents of the aliphatic amines may be straight-chained or branched. In addition thereto, they may also contain double bonds or substituents, for example, halogen atoms or hydroxyl groups. As branched-chain amines, there may be used those obtained by the reaction of branched olefines, for example, diisobutylene, tripropylene and tetrapropylene with hydrocyanic acid in the presence of sulfuric acid and subsequent hydrolysis of the N-formylamines formed. As examples, there may be mentioned methylamine, isobutylamine, n-hexylamine, 2-ethylhexylamine, dodecylamine, coconut oil alkylamine, stearylamine, oleylamine, dimethylamine, diethylamine, dibutylamine, didodecylamine, N-methylstearylamine, montanic acid alkylamine, allylamine, monoethanolamine, isopropanolamine, diethanolamine, di-(3-hydroxypropyl)-amine, cyclohexylamine, hexahydrotoluidine, benzylamine, β-phenylethylamine, N-methylbenzylamine, dibenzylamine, and others.

In addition to the amines of the above classes, there may also be used in the reaction according to the present invention amines in which the nitrogen atom of the amino group is a part of a hydrogenated heterocyclic ring system and in which the amino group behaves like that of an aliphatic amine.

Examples of such heterocyclic hydrogenated compounds are piperidine, morpholine, 1,2,3,4-tetrahydroisoquinoline, piperazine, pyrrolidine, and the like.

In addition to the primary or secondary monoamines, polyamines may also be used in the process of the present invention. As such polyamines, there may be used compounds in which the amino groups are adjacent to one another, for example, α,β-diamines, or compounds in which the amino groups are farther apart from one another in the molecule or are even in the terminal position, for example, α,ω-diamines. Examples of such compounds are: ethylene diamine, 1,2-diaminopropane, 1,6-diaminohexane, N-dodecyl-1,3-diaminopropane, N-stearyl-1,4-diaminopropane, 4,4'-diamino-dicyclohexyl methane, and the like. Further, there may be used as polyamines polyalkylene-polyamines, thus polyamines in which the hydrocarbon radical is interrupted by NH-groups: diethylenetriamine, triethylenetetramine, tetraethylenepentamine, dipropylenetriamine, and the analogous propylenepolyamines or butylenepolyamines. Furthermore, the following polyamines may also be used in the process of the present invention: bis-N,N'-(γ-aminopropyl)-ethylene-diamine, spermin, polyethylene-polyamines obtained, for example, by the polymerization of ethyleneimine or 2-methylethyleneimine.

The reaction of the carbyl sulfates with ammonia or with the amines that may be used is advantageously carried out in water and in the presence of an organic solvent, preferably a solvent which is not miscible or only difficultly miscible with water. Low molecular weight aliphatic hydrocarbons, for example, methylene chloride or ethylene chloride, proved particularly advantageous. However, the reaction may also be carried out in water and without an organic solvent and the reaction products formed are then isolated by extraction with a suitable organic solvent.

The reaction is carried out in the presence of alkaline earth metal hydroxides, preferably hydroxides of metals that have high atomic weights, for example, calcium and barium, because of the higher basicity. In general, calcium hydroxide will be used because it can be easily prepared.

The alkaline earth metal hydroxides, which are advantageously used in excess, can be added initially in their entirety, or they can be added in portions during the reaction. In most cases it is sufficient to use 2 mols of alkaline earth metal hydroxide per 1 mol of amine.

The carbyl sulfate or alternatively the substituted carbyl sulfates are added either in bulk or dissolved in an organic solvent while stirring vigorously. The total quantity of ammonia or primary or secondary amines may be used initially, or they may be added in portions during the reaction. In general, it is sufficient to maintain a molecular proportion of carbyl sulfate:amine of about 1:about 1; it may, however, also be advantageous to use an exces of carbyl sulfate of up to about a molecular proportion of 2:1.

The reaction is generally carried out at temperatures in the range of −10° C. and +100° C., preferably in a temperature range of between −5° C. and +60° C., in particular between 0° C. and 30° C.

Owing to their reactivity, the alkenyl-sulfonamide-containing compounds obtained by the process of the present invention are valuable products, for example, for the preparation of textile auxiliary products, plastics, pesticides, dyestuffs, etc.

The following examples illustrate the invention, but they are not intended to limit it thereto. Unless otherwise stated, the parts in the examples are by weight and the melting points are uncorrected.

Example 1

530 parts of carbyl sulfate are added, at 0° C. to 5° C., during the course of 60 minutes, while cooling and vigorously stirring, to a mixture of 141 parts of n-hexylamine, 1000 parts of water, 1260 parts of ethylene chloride, and 260 parts of calcium hydroxide. The mixture is then stirred for 30 minutes at 0° C. to 10° C., and subsequently for a further 30 minutes at 20° C. to 25° C.

After separation of the sediment of calcium salt and after washing with ethylene chloride, the ethylene chloride layer separated from the aqueous phase is washed with dilute acetic acid until neutral and liberated from solvent under reduced pressure. Crude N-n-hexylethene-sulfonamide remains behind in a yield of 60 to 70% in the form of an oil which can be distilled for further purification (boiling point at a pressure of 0.1 mm. Hg=110° C. to 115° C., $n_D^{20}=1.464_7$).

When using the seventh part of the above-specified substances and replacing the calcium hydroxide by 100 parts of barium oxide and otherwise working in the same manner, there is obtained N-n-hexylethene-sulfonamide in a somewhat smaller yield.

Example 2

380 parts of carbyl sulfate are added at 0° C. to 5° C., while stirring, during the course of about 2 hours, to a mixture of 73 parts of n-butylamine, 400 parts of water, 500 parts of ethylene chloride, and 148 parts of calcium hydroxide. The mixture is then stirred for a further 2 hours at 20° C. and then worked up in the manner described in Example 1. From the ethylene chloride phase, N-n-butylethene-sulfonamide is obtained in a yield of 45%; the compound can be distilled (boiling point at a pressure of 0.1 mm. Hg=90° C. to 93° C., $n_D^{20}=1.465_4$).

Example 3

187 g. of methyl-carbyl sulfate are added, at 0° C. to 5° C., during the course of 50 minutes, to a mixture of 47 parts of n-hexylamine, 350 parts of water, 440 parts of ethylene chloride and 86 parts of calcium hydroxide. The whole is stirred for about 60 minutes at 5° C. and then worked up in the manner described in Example 1. N-n-hexylprop-1-ene-1-sulfonamide (boiling point at a pressure of 0.1 mm. Hg=153° C. to 155° C., $n_D^{20}=1.469_5$) is obtained from the ethylene chloride phase.

Example 4

81 parts of ethyl-carbyl sulfate are added, while stirring, at 15° C. to 17° C., and during the course of 30 minutes, to a mixture of 20 parts of cyclohexylamine, 150 parts of water, 190 parts of ethylene chloride and 37 parts of calcium hydroxide, the mixture is stirred for 1 hour at 25° C. and then worked up in the manner described in Example 1. N-cyclohexylprop-1-ene-1-sulfonamide (boiling point at a pressure of 0.1 mm. Hg=141° C. to 145° C., melting point 61° C. to 63° C.) is obtained from the ethylene chloride phase.

Example 5

376 parts of carbyl sulfate are added, while stirring, at 0° C. to 5° C., within the course of 45 to 50 minutes, to a mixture of 121 parts of N-methylbenzylamine, 750 parts of water, 940 parts of ethylene chloride and 175 parts of calcium hydroxide. The mixture is then stirred for 60 minutes at 0° C. to 5° C. and worked up in the manner described in Example 1. N-methyl-N-benzylethene-sulfonamide is obtained in a yield of 63% and in the form of an oil which can be further purified by distillation (boiling point at a pressure of 0.1 mm. Hg=111° C. to 114° C., $n_D^{20}=1.537_2$) from the ethylene chloride phase.

When using instead of N-methylbenzylamine 107 parts of benzylamine and adding the carbyl sulfate during the course of 65 minutes at 0° C. to 5° C. and further stirring the mixture for a further 70 minutes at 0° C. to 5° C., N-benzylethene-sulfonamide is obtained from the ethylene chloride phase in a crude yield of 45%; it can be further purified by distillation (boiling point at a pressure of 0.1 mm. Hg=137° C. to 140° C., $n_D^{20}=1.549_0$).

Example 6

580 parts of carbyl sulfate are added, while stirring, at 0° C. to 5° C., during the course of about 1½ hours, to a mixture of 130 parts of β-methylaminopropionitrile, 750 parts of water, 940 parts of ethylene chloride and 286 parts of calcium hydroxide. The mixture is stirred for a further 60 minutes at 5° C. and for a further 45 minutes at 25° C. and then worked up as described in Example 1. N-methyl-N-β-cyanoethylethene-sulfonamide (boiling point at a pressure of 0.1 to 0.2 mm. Hg=148° C. to 152° C., melting point 50° C. to 51° C.) is obtained from the ethylene chloride phase.

Example 7

220 parts of carbyl sulfate are added, while stirring, at 0° C. to 5° C., within about 30 minutes, to a mixture of 74 parts of β-n-butylaminopropionitrile, 420 parts of water, 525 parts of ethylene chloride, and 119 parts of calcium hydroxide. Stirring is continued for 60 minutes at 0° C. to 5° C. and for a further 60 minutes at 20° C. to 25° C. The reaction mixture is worked up in the manner described in Example 1. N-n-butyl-N-β-cyanoethyl-ethene-sulfonamide is obtained in a yield of 60% from the ethylene chloride phase. For further purification, the compound can be distilled (boiling point at a pressure of 0.1 mm. Hg=128° C. to 134° C., $n_D^{20}=1.477_5$ after two distillations).

Example 8

265 parts of carbyl sulfate are added, while stirring, at 0° C. to 5° C., within 50 minutes, to a mixture of 59 parts of piperidine, 500 parts of water, 620 parts of ethylene chloride, and 130 parts of calcium hydroxide. The reaction mixture is first stirred for 30 minutes at 0° C. to 5° C., and then for 1 hour at 20° C.; it is then worked up as described in Example 1. Ethene-sulfone-piperidine is isolated from the ethylene chloride phase by distillation (boiling point at a pressure of 0.01 to 0.05 mm. Hg=83° C. to 90° C., melting point 31° C. to 32° C.).

Example 9

75 parts of carbyl sulfate are added, while stirring, at 5° C. to 10° C., during the course of about 15 minutes, to a mixture of 40 parts of N-methyl-1-aminododecane, 300 parts of water, 386 parts of ethylene chloride, and 40 parts of calcium hydroxide. The reaction mixture is then stirred for 20 minutes at 10° C. to 15° C., and for 60 minutes at 20° C. to 25° C.; it is then worked up in the manner described in Example 1. The ethylene chloride phase is washed with 100 parts of 2 N acetic acid, then with 100 parts of water; if necessary, a saturated sodium chloride solution may be added to prevent the formation of an emulsion. After separation of the ethylene chloride by distillation under reduced pressure, N-methyl-N-n-dodecylethene-sulfonamide remains behind in a yield of 30%; for further purification it can be distilled (boiling point at a pressure of 0.05 to 0.1 mm. Hg=139° C. to 146° C., melting point 33° C. to 34° C.).

Example 10

400 parts of carbyl sulfate are added, during the course of 70 minutes, at 0° C. to 5° C., to a mixture of 90 parts of aqueous ammonia of 20% strength, 400 parts of water, 500 parts of ethylene chloride and 220 parts of calcium hydroxide. The reaction mixture is stirred for 30 minutes at 0° C. to 5° C. and for a further 60 minutes at 20° C. to 25° C. The sludge of calcium salt is then filtered off with suction and the pH of the aqueous phase of the filtrate separated from ethylene chloride is adjusted to 6 to 7 by the addition of hydrochloric acid. The aqueous solution is extracted with ethyl acetate. After extraction of the ethyl acetate under reduced pressure vinyl-sulfonamide remains behind as distillation residue (yield 33%) in the form of an oil which can be distilled without decomposition (boiling point at a pressure of 0.05 mm. Hg=94° C. to 95° C., melting point 23° C. to 24° C., $n_D^{30}=1.482_0$).

If instead of calcium hydroxide the equivalent amount of magnesium hydroxide is used, there is obtained also vinyl-sulfonamide, though in a somewhat smaller yield.

Example 11

75 parts of methyl-carbyl sulfate (obtained from propene and sulfur trioxide) are added, while stirring, at 15° C. to 20° C., within 30 minutes, to a mixture of 20 parts of cyclohexylamine, 150 parts of water, 190 parts of ethylene chloride and 37 parts of calcium hydroxide. Stirring is continued for a further 60 minutes at 25° C. and the mixture is then worked up in the manner described in Example 1. N-cyclohexylprop-1-ene-1-sulfonamide is obtained from the ethylene chloride phase by separation of the solvent by distillation under reduced pressure. The yield is 36%. The compound can be purified by distillation (boiling point at a pressure of 0.1 mm. Hg=141° C. to 145° C. melting point 61° C. to 63° C.).

Example 12

182 parts of methyl-carbyl sulfate are added, while stirring, during about 60 minutes, at 15° C. to 20° C., to a mixture of 26.4 parts of 1,4-diaminobutane, 300 parts of water, 375 parts of ethylene chloride, and 138 parts of calcium hydroxide. The whole is stirred for 70 minutes at 20° C. to 25° C. and the reaction mixture is worked up as described in Example 1. After separation of the ethylene chloride by distillation, 1,4-bis-(propene-sulfonamido)-butane (melting point 97° C. to 99° C.) is obtained.

Example 13

450 parts of carbyl sulfate are added at 0° C. to 5° C., within the course of 45 minutes, to a mixture of 70 parts of 1,6-diaminohexane, 600 parts of water, 750 parts of ethylene chloride, and 220 parts of calcium hydroxide. Stirring is continued for about 1 hour at 25° C. and the reaction mixture is then worked up as described in Example 1. After having separated the ethylene chloride by distillation under reduced pressure. 1,6-bis-(ethene-sulfonamido)-hexane is obtained in the form of an oil which crystallizes upon prolonged standing (melting point 54° C. to 56° C.).

Example 14

75 parts of carbyl sulfate are added, while stirring and cooling, at 0° C. to 5° C., within 25 minutes, to a mixture of 23.4 parts of sarcosin ethyl ester (N-methylaminoacetic acid ethyl ester), 150 parts of water, 190 parts of ethylene chloride, and 37 parts of calcium hydroxide. Stirring of the reaction mixture is continued for 30 minutes at 0° C. to 5° C. and then for a further 30 minutes at 20° C. to 25° C. and the reaction mixture is then worked up as usual. The ethylene chloride phase contains N-methyl-N-carbethoxymethylethene-sulfonamide (boiling point at a pressure of 0.1 mm. Hg=94° C. to 96° C., $n_D^{20}=1.4648$).

We claim:

1. A process for preparing an alkenyl sulfonamide having at least one

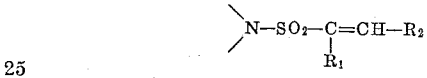

group therein, which consists essentially of mixing a carbyl sulfate of the formula

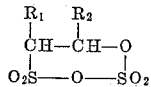

wherein $R_1$ and $R_2$ each represent hydrogen or lower alkyl, at a temperature between —10° and 100° C. with a member selected from the group consisting of ammonia and primary and secondary alkyl amines having 1–18 carbon atoms, cyano lower alkyl amines, cyclohexyl amine, benzyl amine and N-lower alkyl benzyl amines, lower carbalkoxy lower alkyl amines, lower alkylene diamines, piperidine, morpholine, piperazine, and tetrahydroisoquinoline in an aqueous medium in the presence of an alkaline earth metal hydroxide, the molar ratio of carbyl sulfate to amine being between about 1:1 and about 2:1.

2. An N-substituted alkenyl sulfonamide having two

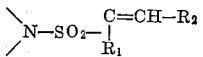

groups therein, wherein $R_1$ and $R_2$ are hydrogen or lower alkyl and >N . . . is derived from a lower alkylene diamine or piperazine.

References Cited

UNITED STATES PATENTS

| | | | |
|---|---|---|---|
| 2,709,707 | 5/1955 | Park | 260—556 |
| 3,116,257 | 12/1963 | Klass | 260—556 X |
| 3,234,257 | 2/1966 | Kuhne et al. | 260—556 X |

FOREIGN PATENTS

| | | |
|---|---|---|
| 758,682 | 11/1952 | Germany. |
| 686,061 | 1/1953 | Great Britain. |
| 620,445 | 1/1963 | Belgium. |

OTHER REFERENCES

Petrow et al., Zhur. Obsch. Khim., vol. 29, pp. 1494 to 1496 (1959).

Suter et al., J. Am. Chem. Soc., vol. 65, pp. 507–517 (1943).

Bordwell et al., J. Am. Chem. Soc., vol. 76, pp. 3952 to 3956 (1954).

JOHN D. RANDOLPH, *Primary Examiner.*